Oct. 7, 1924.                                                1,511,168
                         F. JESS
                    DIRECTION INDICATOR
                    Filed Nov. 2, 1923
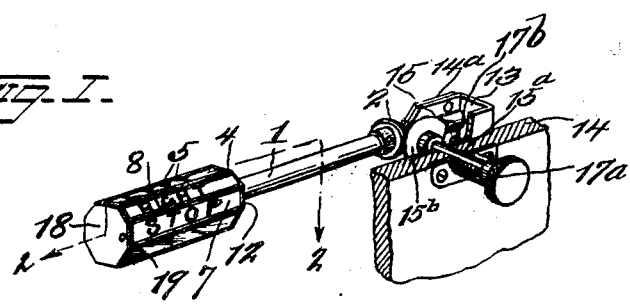
INVENTOR
Fred Jess Patented Oct. 7, 1924.

1,511,168

UNITED STATES PATENT OFFICE.

FRED JESS, OF DAVENPORT, IOWA.

DIRECTION INDICATOR.

Application filed November 2, 1923. Serial No. 672,421.

*To all whom it may concern:*

Be it known that FRED JESS, a citizen of the United States, residing at Davenport, in the county of Scott and State of Iowa, has invented new and useful Improvements in Direction Indicators, of which the following is a specification.

In a direction indicator, the present invention has for its purpose to provide a very simple construction wherein a member is rotatable and, since said member is supplied with diametrically opposite blank faces and diametrically opposite faces with "Right", "Left" and "Stop" thereon, directions as to the course of an automobile may be transmitted simultaneously to those in the rear and in the front.

Another purpose is to provide an indicator comprising an eight-sided rotating frame member with glasses in the sides containing directions to indicate forward travel, right and left turn and stop, in conjunction with means for rotating the member so that when the member is disposed to indicate "Right", "Left", "Stop", or forward travel, said directions may be read by those in front or those in the rear.

Still another purpose is to provide a direction indicator which may be used in the night as well as in the day. When used in the day, means is provided to prevent disclosure of all directions excepting any two, one of which may be displayed from the rear, the other being on display from the front.

A further purpose is the provision of means for rotating the outer member of the direction indicator, whereby any two directions may be on display.

It is to be understood that the particulars herein given are in no way limitative and that, while still keeping within the scope of the invention, any desired modifications of detail and desired proportions may be made in the apparatus according to the circumstances.

The invention comprises further features and combinations of parts to be hereinafter set forth, shown in the drawings and claimed.

In the drawings:

Figure 1 is a view in perspective of the improved indicator constructed in accordance with the invention and showing the same as applied to the windshield of an automobile.

Figure 2 is a longitudinal sectional view through the indicator on line 2—2 of Figure 1.

Figure 3 is a transverse sectional view through the indicator.

Figure 4 is a sectional view on line 4—4 of Figure 2.

Figure 5 is a detail view showing the mutilated gear and the means for limiting the same in its movements.

Referring to the drawings, 1 designates an outer tubular shaft which has a bevel gear 2 at one end for rotating the tubular shaft around a tubular support 3. The other end of the tubular member 1 terminates in a frame 4 which has eight sides. The bars 5 constituting parts of the frame have channels 6 for the reception of glass sections 7. The glass sections are colored either red or blue, preferably the latter. Two of these glass sections are entirely colored, thereby providing blank faces 8 which indicate travelling forward.

The faces or glasses which are blank are diametrically disposed so that one is disposed facing to the rear and the other is disposed facing to the front. It will be noted that this leaves six other faces. A certain pair of diametrically opposite faces have "Left" thereon, two other diametrically opposite faces have "Right" thereon, while the third diametrically opposite faces have "Stop" thereon. In order to form the words on the faces, the glasses are left clear in the bodies of the letters forming the words so that a light on the interior of the member will reflect through the letters of certain of the words, it depending upon the directions disclosed by the indicator which will disclose the course to be followed by the chauffeur.

In order to prevent the light from reflecting through the openings of the letters of the words which are not used, diametrically opposite shields 9 are provided. These shields cover any four of the words on the interior of the member in order to prevent the light from shining therethrough. The shields 9 are spaced which causes opposite spaces to be formed which permit the light to shine through any two diametrically opposite similar signals or directions. In other words, when the shields are disposed to cover any four of the directions, the spaces 10 are arranged to permit the light to shine through the letters of the words indicating the other two similar directions. The shields project laterally from a disk or head 12 which is carried by one end of the tubular support 3.

A bracket 13 is secured to the outer face of the dash 14 of an automobile and is provided with a semicylindrical bearing or recess 15. The bracket 13 is U-shaped and the bearing or recess 15 is formed in the outer arm of the bracket, there being a plate 14ª (which is provided with a similar bearing or recess 14ᵇ secured to the outer arm of the bracket. The two bearings or recesses 14ᵇ and 15 clamp and retain the tubular support 3 in position.

A shaft 15ª is mounted in bearings of the dash and the bracket 13 and carries a beveled gear 15ᵇ at one end meshing with the beveled gear 2 which is secured to the outer tubular shaft 1 so that, when the shaft 15ª is rotated, motion is imparted to the gear 2 and the tubular shaft 1 which carries the frame 4. The other end of the shaft 15ª carries a knob or handle 17ª for imparting rotary motion to the shaft 15ª.

A suitable bulb or light 16 is engaged with the outer end of the tubular support 3 and connected to the bulb 16 are the usual wires or leads 17 which pass through the support 3 and are connected to the lighting system (not shown) of the automobile by means of a cut-out switch (not shown) which may be attached to the clutch pedal so that when it is desired to change the directions, it is only necessary to apply foot pressure on the clutch pedal. When the clutch pedal is released, the light is turned off, thereby preventing the light from shining through the letters of the words which are disposed for indicating the directions.

The outer faces of the shields 9 are colored the same tint as the coloring of the glasses so that, when the indicator is operated in the day time and the shields are disposed to cover the directions which are not desired, the corresponding colors will act to prevent said undesired directions from being exposed. However, the inner face of the disk or wheel 12 and the inner faces of the shields 9 are painted white or white enameled, acting to reflect a light through the uncovered words when the light from the bulb is turned off, thereby permitting the directions to be read in the day time. The frame 4 has hinged to its outer end a cover or closure 18 which has a catch or latch 19 to hold the cover closed. The inner face of this cover is also painted white or white enameled so as to reflect light on the interior of the frame, whereby it may shine through the uncovered words which give the directions which are being used.

When the bevel gear 2 is turned so that the letters of the word "Right" are perpendicular and facing to the rear, the corresponding word is facing to the front, and when the word "Left" is facing to the rear the corresponding word is facing to the front. This is also true with regard to the word "Stop", and when the blank face is disposed facing to the rear, a corresponding face is disposed to the front.

One of the plain glass sections or faces 8 may be a mirror so that, when the signal is turned so that it faces to the rear, it may be used to give the operator or chauffeur a view of the road at the rear of the automobile, thereby dispensing with the usual mirror which is carried on the side of the automobile body.

Projecting from the dash or instrument board is an abutment pin 17ᵇ which limits the mutilated gear 15ᵇ in its movements. In other words, the construction and arrangement of the cut-away or mutilated portion of the gear 15ᵇ is such that when one end of this cut-away portion engages the abutment pin 17ᵇ, one of the blank surfaces of the signal faces rearwardly. This blank surface may be a mirror so that the operator can observe vehicles at the rear. The other blank surface may be merely a plain glass although it is obvious that both blank surfaces may be either plain glass or mirrors. When the other end of the mutilated or cut-away portion of the gear 15 engages the abutment pin 17ᵇ, the other blank surface may face to the rear.

The invention having been set forth, what is claimed is:

1. A direction indicator comprising a revoluble frame having a pair of diametrically opposite blank faces and a plurality of colored faces with transparent words indicating diametrically opposite right, left and stop directions, means for covering certain of said directions, certain other of said directions being uncovered, whereby a light reflection may appear through the letters of said directions, said frame having a tubular extension, a tubular support passing through the tubular extension and provided with the direction covering means at one end with a clamp at the other end adapted for attachment to a stationary support, and means operatively connected with and adjacent the end of the tubular extension for rotating the same and rotating the frame for changing the directions.

2. A direction indicator comprising a revoluble frame having a pair of diametrically opposite blank faces, one of which being a mirror, and a plurality of colored faces with transparent words indicating diametrically opposite right, left and stop directions, means for covering certain of said directions, certain other of said directions being uncovered, whereby a light reflection may appear through the letters of said directions, said frame having a tubular extension, a tubular support passing through the tubular extension and provided with the direction covering means at one end with a clamp at the other end adapted for attachment to a stationary support, a bracket to be secured to the dash of an automobile and including a clamp operatively connected to the tubular support, and manually operated means loosely mounted in the bracket and the dash and operatively connected with the tubular extension for imparting rotating movements to the tubular extension and the frame for changing the directions.

In testimony whereof he affixes his signature.

FRED JESS.